United States Patent [19]
Adamczyk, Jr. et al.

[11] Patent Number: 5,814,287
[45] Date of Patent: Sep. 29, 1998

[54] POLYMERIZATION CATALYST ENHANCED HYDROCARBON TRAPPING PROCESS

[75] Inventors: Andrew Anthony Adamczyk, Jr., Dearborn, Mich.; Anthony David Logan, Chandler, Ariz.

[73] Assignee: Ford Global Technologies, Inc., Dearborn, Mich.

[21] Appl. No.: 969,558

[22] Filed: Nov. 13, 1997

Related U.S. Application Data

[63] Continuation of Ser. No. 670,384, Jun. 25, 1996, abandoned, which is a continuation of Ser. No. 270,972, Jul. 5, 1994, abandoned.

[51] Int. Cl.[6] .......................... B01D 53/02; B01D 53/94; B01D 53/72
[52] U.S. Cl. ................. 423/213.7; 423/212; 423/213.2; 423/213.5; 423/245.1
[58] Field of Search ................. 423/213.5, 213.2, 423/213.7, 212 R, 212 C, 245.3, 245.1; 95/143, 144; 502/66

[56] References Cited

U.S. PATENT DOCUMENTS

| | | | |
|---|---|---|---|
| 3,584,994 | 6/1971 | Herbsman | 423/212 |
| 4,458,097 | 7/1984 | Garska et al. | 585/415 |
| 4,862,836 | 9/1989 | Chen et al. | 502/253 |
| 4,985,210 | 1/1991 | Minami | 423/213.5 |
| 5,051,244 | 9/1991 | Dunne et al. | 423/213.5 |
| 5,140,811 | 8/1992 | Minami et al. | 423/213.7 |
| 5,142,864 | 9/1992 | Dunne | 423/213.7 |
| 5,185,305 | 2/1993 | Subramanian et al. | 423/213.5 |
| 5,284,638 | 2/1994 | Hertl et al. | 423/213.2 |
| 5,292,696 | 3/1994 | Ito et al. | 502/66 |
| 5,310,714 | 5/1994 | Grasselli et al. | 502/64 |
| 5,336,476 | 8/1994 | Kintaichi | 423/212 |
| 5,379,586 | 1/1995 | Honji et al. | 60/276 |

FOREIGN PATENT DOCUMENTS

| | | | |
|---|---|---|---|
| 9187056 | 5/1992 | Australia | 423/213.2 |
| 460542 | 12/1991 | European Pat. Off. | 423/213.5 |
| 0 466 318 | 1/1992 | European Pat. Off. | |
| 526896 | 2/1993 | European Pat. Off. | 502/77 |
| 0 584 737 | 3/1994 | European Pat. Off. | |
| 1-247710 | 10/1988 | Japan | 502/77 |
| 05-96182 | 4/1993 | Japan | 423/213.2 |

*Primary Examiner*—Michael Lewis
*Assistant Examiner*—Peter DiMauro
*Attorney, Agent, or Firm*—Lorraine S. Melotik

[57] ABSTRACT

This invention is directed to a catalyst system for treating internal combustion engine exhaust gases, the system having enhanced hydrocarbon trapping efficiency which is particularly advantageous during cold start. The system comprises a hydrocarbon polymerization catalyst, a hydrocarbon trap located downstream of the hydrocarbon (HC) polymerization catalyst, advanced exhaust treatment catalyst. The hydrocarbon polymerization catalyst is capable of forming larger (HC) molecules from smaller HC molecules.

6 Claims, 3 Drawing Sheets

POLYMERIZATION CATALYST ENHANCED HYDROCARBON TRAPPING PROCESS

This application is a continuation, of application Ser. No. 08/670384, filed Jun. 25, 1996, now abandoned, which is a continuation of application Ser. No. 08/270,972 filed Jul. 5, 1994, now abandoned.

FIELD OF THE INVENTION

The invention is directed to a catalyst system for treating internal combustion engine exhaust gases. More particularly, the system comprises a hydrocarbon polymerization catalyst, a hydrocarbon trap located downstream of the hydrocarbon polymerization catalyst, and an exhaust treatment catalyst such as a three-way catalyst. The hydrocarbon (HC) polymerization catalyst is capable of forming larger molecular weight HC from smaller HC molecules.

BACKGROUND OF THE INVENTION

In order to meet Federal emissions regulations and California ULEV emissions levels, means in addition to an exhaust treatment catalyst may be required in the emission system to prevent the exit, to the atmosphere, of unburnt or partially burnt engine-out hydrocarbon emissions. These emissions can occur in abundance during the cold start period of the engine before the normal exhaust treatment catalyst is operational. Hydrocarbon (HC) traps have been suggested for trapping such emissions. Generally it is suggested that during cold start, the exhaust gas from the engine be routed through a HC trap containing a material like activated carbon, and then through the normal catalyst. Later, at higher temperatures at which the catalyst is operational, the engine exhaust merely passes through the normal exhaust catalyst. One disadvantage with such conventional trapping materials is that they cannot hold Low Molecular Weight HydroCarbon Species (LMWHCS) very efficiently. Typically, as the temperature of the trapping material rises, these LMWHCS such as ethene, ethane, propane, propene and others, are released to the atmosphere before the exhaust treatment catalyst in the vehicle exhaust system is activated.

U.S. Pat. No. 4,958,210 to Minami suggests using Y-type zeolite or mordenite upstream of the normal exhaust catalyst to act as a HC trap, preferably in combination with an activated carbon trap located upstream of the zeolite HC trap. According to the disclosure of the patent, Minami routes the exhaust gas through the activated carbon and then through the zeolite, because the activated carbon absorbs HCs at lower temperatures while the zeolite absorbs HCs at higher temperatures. In contrast, the present inventors route the engine exhaust over a polymerization catalyst like ion-exchanged zeolites and then through a conventional HC trap material like activated carbon. We have found that by passing the engine exhaust over the polymerization catalyst during cold start, LMWHCS are converted to higher molecular weight hydrocarbon species which are much more readily retained by the conventional HC trapping materials like activated carbon. Hence, by providing the engine exhaust through the combination of a polymerization catalyst first before providing it through a conventional HC trap, larger HC molecules are formed which are more tenaciously absorbed and retained by the activated carbon, than are the smaller HC molecules present before such polymerization. Hence, the hydrocarbon trapping efficiency during cold start is significantly enhanced by the present invention as compared to prior HC trapping inventions.

DISCLOSURE OF THE INVENTION

The invention is directed to a catalyst system, having enhanced hydrocarbon trapping efficiency, for treating internal combustion engine exhaust gases. The catalyst system comprises a (1) hydrocarbon polymerization catalyst, and (2) a hydrocarbon absorber located downstream of the hydrocarbon polymerization catalyst. The hydrocarbon polymerization catalyst is capable of forming larger molecular weight hydrocarbon molecules from smaller molecular weight hydrocarbon molecules. The catalyst system also includes an exhaust treatment catalyst located downstream of the polymerization catalyst, the exhaust treatment catalyst preferably being selected from the group consisting of oxidation catalysts and three-way catalysts.

BRIEF DESCRIPTION OF THE DRAWINGS

FIG. 3 shows the effect of molecule size on hydrocarbon trapping efficiency at a temperature less that 50° C., while FIG. 4 shows the trapping efficiency when the temperature is greater than 50° C.

DETAILED DESCRIPTION OF THE PREFERRED EMBODIMENTS

The catalyst system according to this invention is operative to treat the exhaust gases generated by a fossil-fueled internal combustion engine, particularly a gasoline-fueled internal combustion engine when operated under a variety of conditions, i.e. from cold start to warmed-up conditions. Cold start is generally used herein to mean temperatures equivalent to the temperature of the atmosphere at ground level.

Figure 1:
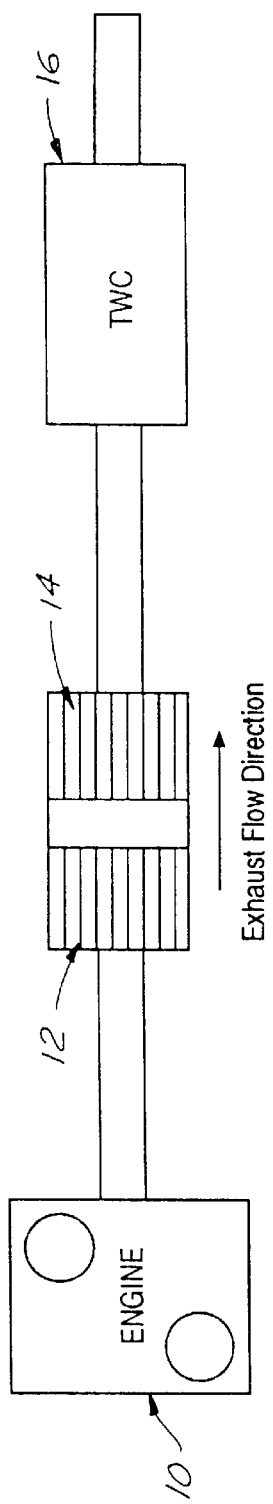
FIGS. 1 and 2 are schematic representations of embodiments of catalyst systems according to the present invention.

One embodiment of the invention catalyst system may be further understood from reference to FIG. 1. As shown in this figure, an automotive engine (10) has a catalyst system including hydrocarbon polymerization catalyst (12), hydrocarbon absorber (i.e, a conventional HC trap) (14) and downstream exhaust treatment catalyst (16) to receive and cleanse exhaust from the engine (10). In this embodiment, and preferably for the catalyst system of this invention, the HC polymerization catalyst is placed near the engine. By being close-coupled to the engine, the HC polymerization catalyst warms rapidly and thus begins quickly to convert low molecular weight hydrocarbon species to those of higher molecular weight. In this configuration, it also acts as thermal protection for the conventional trapping material (14), thereby desirably keeping the trapping material cooler for a longer period. By keeping the conventional trapping material cooler, the time when the trap begins to release HC's to the exhaust treatment catalyst (14) is delayed.

The HC polymerization catalyst may consist of a transition metal-exchanged high silica zeolite catalyst, an acidified silica/alumina material, or a non-ion exchanged high silica zeolite catalyst, i.e., capable of polymerizing low molecular weight hydrocarbons to higher molecular weight hydrocarbons. By this is meant conversion generally of hydrocarbons having generally less than about 4 carbon atoms to those having at least about 4 carbon atoms, preferably to hydrocarbon molecules of 5 to 8 carbon atoms. For example, we have found that exhaust gases such as ethene, propene and propane are converted into higher molecular weight hydrocarbons, such as toluene, benzene, and others as discussed in detail hereinafter.

Zeolites, in general, are aluminosilicates with a framework containing cations such as those of alkali metals and alkaline earth metals. The framework of a zeolite is based on the combination of $AlO_4+SiO_4$ tetrahedrons. Synthetically produced zeolites are most suitable for this invention. A preferred zeolite is of the type ZSM5 which is a crystalline zeolite disclosed in detail in U.S. Pat. No. 3,702,886, the disclosure of which is expressly incorporated herein by reference. ZSM5 used in this invention generally has a $SiO_2/Al_2O_3$ ratio ranging from about 10 to 1000, more preferably in this invention the $SiO_2/Al_2O_3$ ratio is 10–50. Still other zeolitic silica aluminates, such as isomorphously substituted silica aluminates including amorphous silica/alumina are useful in this invention. The transition metal employed to preferably exchange a zeolite according to this invention includes such metals as silver, copper, nickel, chromium, iron, manganese, zinc, calcium, gallium, barium, zirconium, indium, praseodymium, lanthanum, tin, cerium, titanium, cobalt, palladium, rhodium, platinum and compatible mixtures thereof. This HC polymerization catalyst may be formed according to various known catalyst techniques, e.g., by being crushed and pressed or placed on a monolithic ceramic substrate.

For example, a preferred copper ion-exchanged version of such a zeolite may be obtained by stirring a proportion of copper acetate solution (preferably about 0.05M) with the ZSM5 zeolite. The material is filtered, washed, and preferably ion-exchanged three times. It is then dried at about 120° C. for about three hours and calcined at about 600° C. for about three hours. The resulting material will contain copper exchanged for cation(s) of an alkali metal or of a proton of the zeolite as well as copper impregnated onto the zeolite, resulting in a total copper content of about 3% by weight. The limit for the amount of copper exchanged into the zeolite is set by the amount of $Al_2O_3$ in the zeolite. Ion exchange of such materials is well known to those skilled in the art.

According to the embodiment of FIG. 1, gases emanating from engine (10) during cold operation will pass through the HC polymerization catalyst (12) and then to a conventional HC absorber (14), prior to passing through downstream catalyst (16). The hydrocarbon absorber of the invention may be constructed of an activated carbon monolith or pelleted carbon or zeolite (non-ion exchanged) having a suitable washcoat, or other materials known to those skilled in the art and suggested by this disclosure. Such other material may include silica gel, alumina, etc. Although absorber (14) is shown in FIG. 1 as having a single element, those skilled in the art will appreciate that a single element or a variety of elements could be used having not only a single flow path, but alternatively, multiple flow paths according to the present invention.

As shown in FIG. 1, the effluent from the HC polymerization catalyst and hydrocarbon absorber would sequentially be exposed to a exhaust treatment catalyst (16) such as an oxidizing catalyst or a three-way catalyst, which may be of a conventional type or an electrically heated type. The exhaust treatment catalyst of this invention may comprise a wide variety of catalysts as would be apparent to those skilled in the art in view of this disclosure, its selection not being critical. Preferably, the exhaust treatment catalyst is an oxidation catalyst or a three-way catalyst, numerous such catalysts being well known in the art.

The three way catalyst can be selected from numerous such known catalysts including, e.g., but not limited to, noble metal catalysts like platinum, rhodium, or palladium usually configured as, e.g. $Pt/Al_2O_3$ and $Pd/Al_2O_3$. Oxidation catalysts such as silver or even base metals may be employed. Three-way catalysts are however particularly desirable since, in contrast, they are capable of oxidizing the hydrocarbon and carbon monoxide and also reducing the nitric oxide components to innocuous products. Exemplary of typical three-way catalyst formulations are the following: a platinum-rhodium formulation, with respective metals in a weight ratio of 5/1, and a loading of 60 grams/ft$^3$ on a ceramic monolith; and a palladium-rhodium formulation, also with a 5/1 ratio and the same loading of 60 grams/ft$^3$; and a palladium-only formulation with a loading of 100 grams/ft$^3$. These catalyst support materials often also contain promoters and stabilizers such as barium oxide or cerium oxide. The noble metals and promoters and stabilizers are usually deposited on a support such as alumina, silica, titania, zirconia, alumino silicates, and mixtures thereof with alumina being the preferred support. The catalyst can be conveniently employed in particulate form or the catalytic composite can be deposited on a solid monolithic carrier with a monolithic carrier being preferred.

In order that the HC absorbing material located downstream of the HC polymerization catalyst capture the hydrocarbon molecules generated by the HC polymerization catalyst, these components according to this or other embodiments of the invention system would be located at a compatible space velocity, as would be apparent to those skilled in the art in view of the present disclosure. In the invention embodiment of FIG. 1, the HC absorber downstream of the polymerization catalyst is arranged preferably to have a space velocity of 5–100K hr$^{-1}$. The oxidation or three-way catalyst downstream of the HC polymerization catalyst (12) and the hydrocarbon absorber (14) in FIG. 1 is arranged preferably to have a space velocity of 10–100K hr$^{-1}$.

Figure 2:
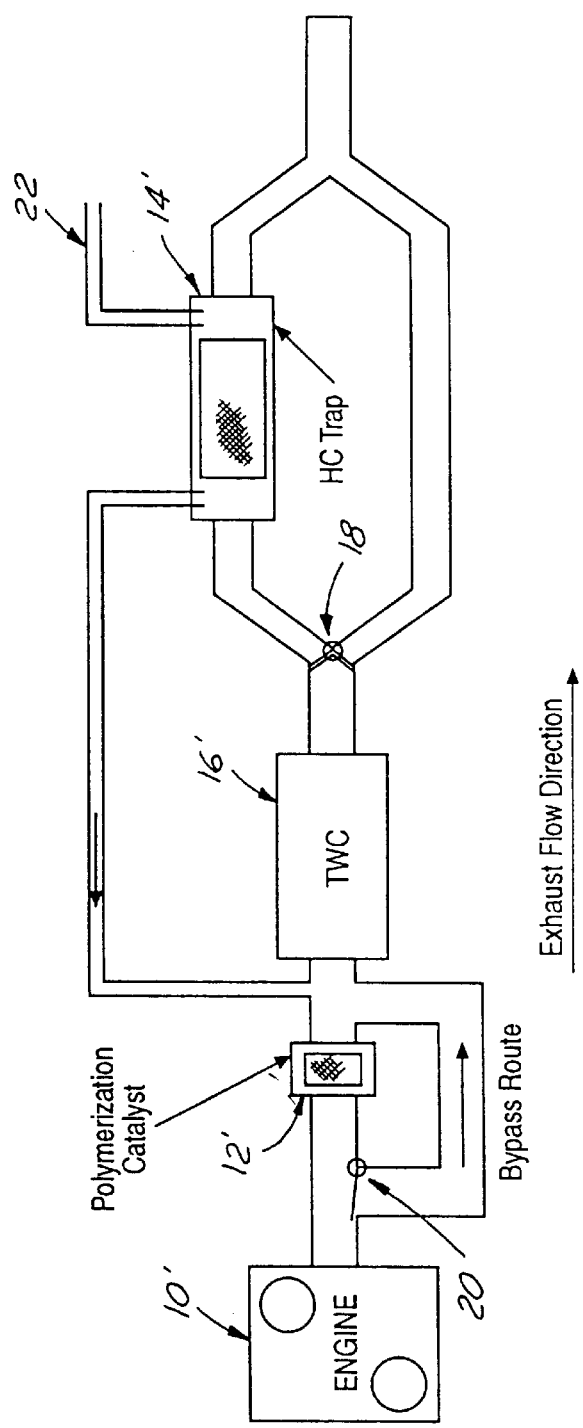

Another embodiment of the invention system is shown in FIG. 2. According to this embodiment, the exhaust conversion catalyst (16') has fewer components ahead of its position and therefore can warm more quickly from the exhaust of engine 10'. The conventional HC absorber (14') is in the downstream position relative the exhaust treatment catalyst (16') (here a three-way catalyst) and requires an additional purging stream (22) according to such an embodiment to refresh its contents. The purging system can use an air-feed generated by a conventional on board air pump or a pulse air valve. In addition, the purge system can use exhaust gases rather than or in addition to ambient air. Also shown in this embodiment is a bypass route with a gate (20) past the HC polymerization catalyst (12') to provide protection for the polymerization catalyst during high-temperature engine operation, i.e, substantially after the cold start. Accordingly, in the embodiments of the invention the exhaust treatment catalyst is located either between the hydrocarbon polymerization catalyst and the hydrocarbon absorber or downstream of the hydrocarbon absorber.

The present invention results in a conversion of low molecular weight hydrocarbon species to those of higher molecular weight. Subsequently, these higher molecular weight hydrocarbon species can be trapped more efficiently and to higher temperature over the hydrocarbon absorber. Propene, ethene and propane are commonly employed in this art area for comparison as typical low molecular weight hydrocarbon species. Reactor studies were carried out to corroborate the advantages of this invention. In these studies both the HC polymerization catalyst material and HC absorbing materials were tested independently.

The studies first consisted of determining the types of large molecular weight hydrocarbons produced after the addition of low molecular weight hydrocarbons. These experiments were conducted in a quartz u-tube reactor of 1 liter volume. According to the study, a 0.1 gram sample of crushed and pressed ZSM5 copper non-exchanged ZSM5, the ZSM5 had a silica/alumina ratio of 30, was placed in the tube and the tube was filled with propane ($C_3H_8$), propene ($C_3H_6$) and ethene ($C_2H_4$) for a period of 0.5 minute. The tube was then evacuated to a pressure of 10–6 torr using a vacuum pump. An electric current was then passed through the ZSM5 sample raising its temperature from 20° C. to 450° C. with the desorbing products being introduced into a mass spectrometer for measurement. Upon analysis, the propane, propene and ethene had been converted in part into toluene, benzene and other larger molecular weight hydrocarbon molecules.

Figure 3:
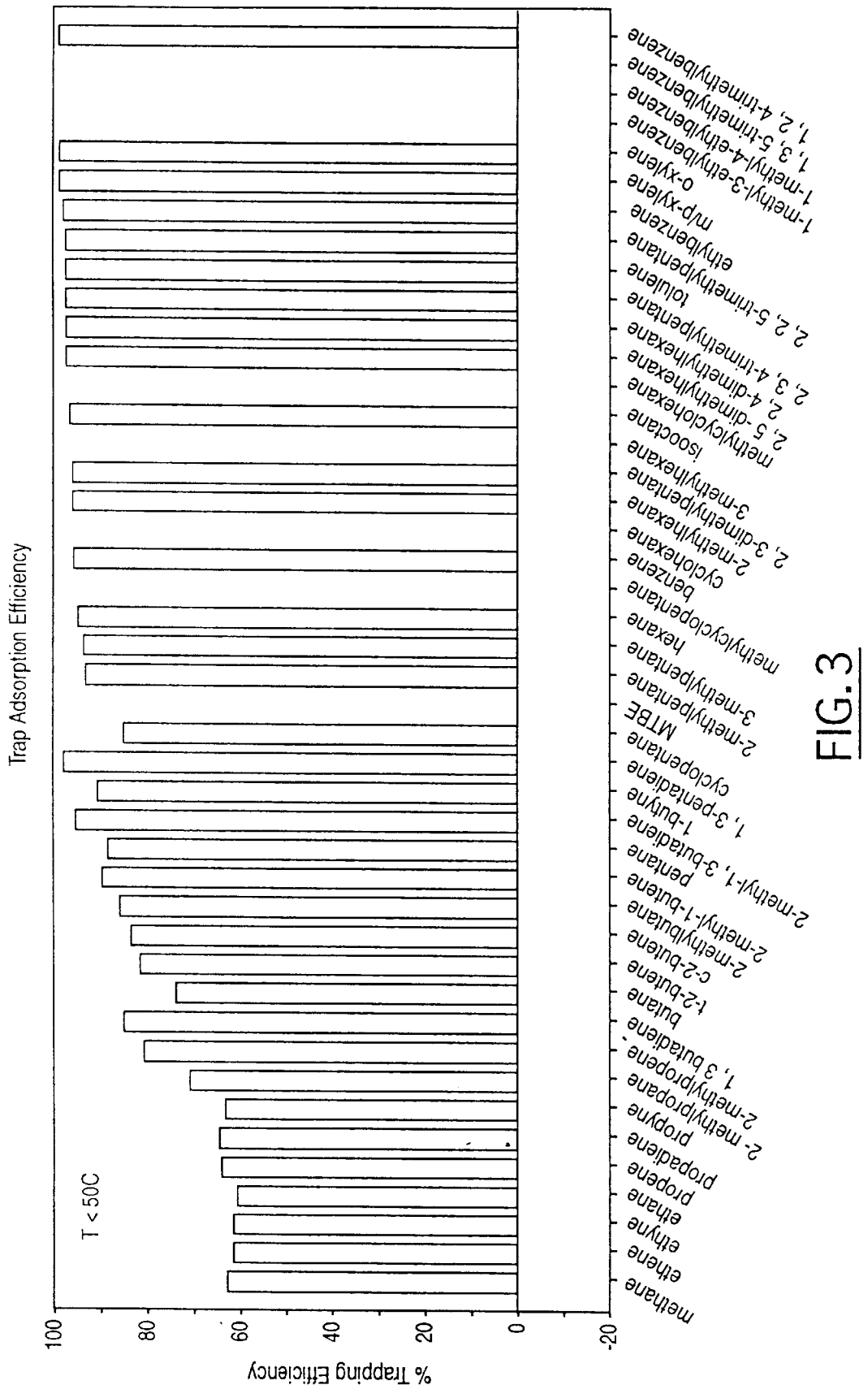
FIGS. 3 and 4 are graphical illustrations of the hydrocarbon trapping efficiency by activated carbon for various molecular weight hydrocarbon species.
Figure 4:
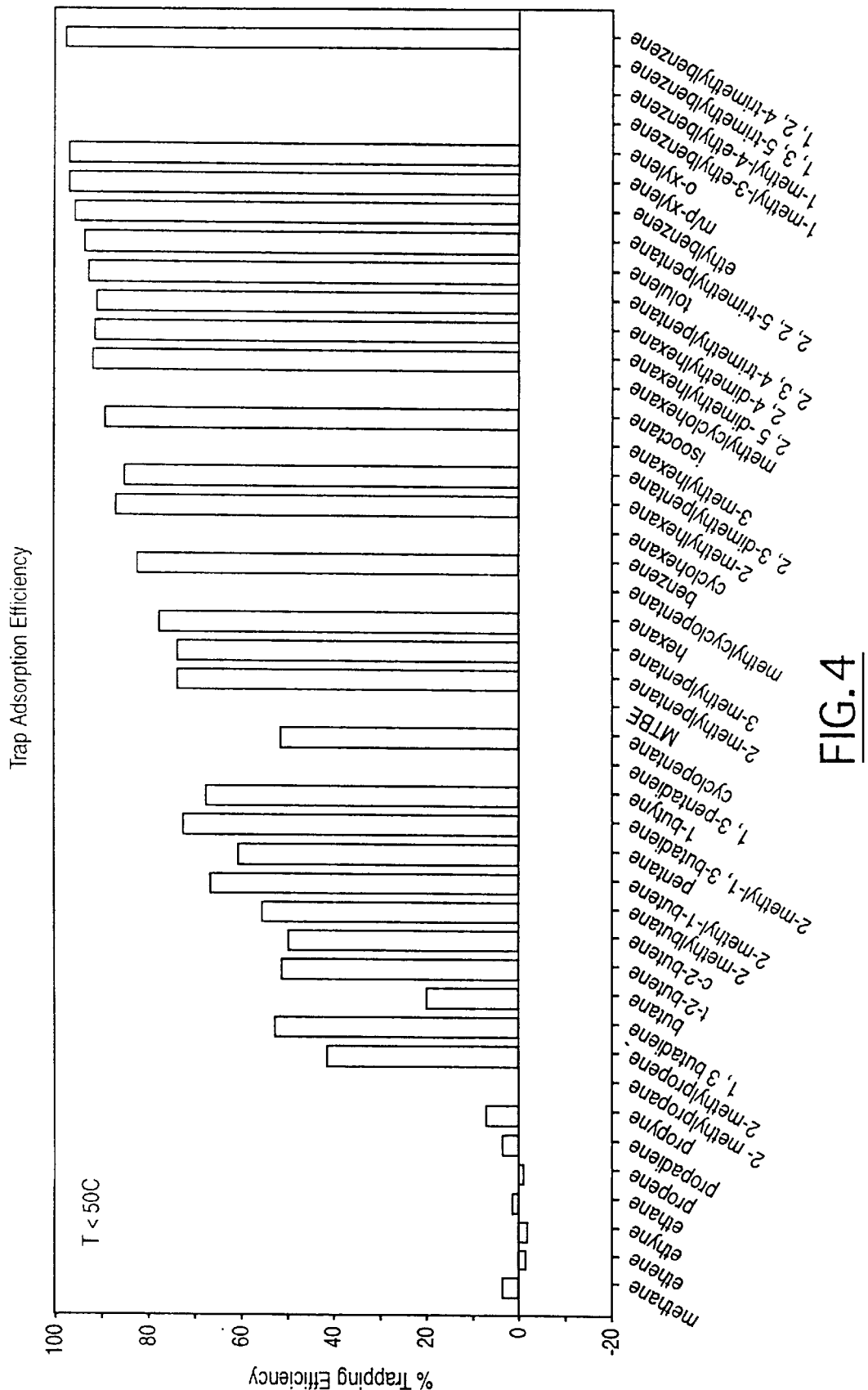

Separately, experiments were conducted in the exhaust system of an internal combustion engine operating on gasoline using a typical HC trap material, i.e., carbonaceous material, in the exhaust stream to trap hydrocarbon molecules. In these experiments, gas samples were removed before and after the trapping material into evacuated pyrex flasks. These samples were then analyzed for their chemical content in a gas chromatograph. When the trapping materials were cold (<50° C.), low molecular weight hydrocarbon molecules were trapped efficiently as shown in FIG. 3 (a trapping efficiency of approximately 60%). However, at temperatures above 50° C., the low molecular weight hydrocarbon molecules were no longer trapped efficiently (trapping efficiency is approximately 0%) while the higher molecular weight hydrocarbon molecules (such as toluene and benzene and others) were still retained by the trap (trapping efficiency >80%). This is shown in FIG. 4.

Surprisingly, according to the present invention, converting low molecular weight hydrocarbons such as ethene, propene and propane into higher molecular weight hydrocarbons, such as toluene, benzene and others by means of a HC polymerization catalyst is found to allow such HC to be trapped more efficiently over a wider range of temperature. As shown in FIGS. 3 and 4, the higher molecular weight HC are captured at an efficiency greater than 80% thus reducing the amount of hydrocarbon leaving the exhaust.

We claim:

1. A method for polymerizing and subsequently trapping hydrocarbons generated during cold start of an internal combustion engine, the method comprising the steps of:

polymerizing said hydrocarbons by means of a polymerization catalyst located in an exhaust gas passage of said engine so as to form larger molecular weight hydrocarbon molecules from smaller molecular weight hydrocarbon molecules under conditions present in said exhaust gas;

trapping said larger molecular weight hydrocarbons on a hydrocarbon absorber located downstream of said polymerization catalyst in said passage and being selected from the group consisting of activated carbon, non-ion exchanged zeolite, silica gel, and alumina; and locating an exhaust treatment catalyst in said passage to oxidize hydrocarbons;

said hydrocarbon polymerization catalyst being located between the engine and said exhaust treatment catalyst in said catalyst system.

2. The method according to claim 1, wherein said hydrocarbon polymerization catalyst is selected from transition metal-exchanged and non-exchanged, high silica zeolite catalyst.

3. The method according to claim 2, wherein said zeolite is ZSM5 having a $SiO_2/Al_2O_3$ ratio from about 10 to 1000.

4. The method according to claim 2, wherein said transition metal is selected from the group consisting of silver, copper, nickel, chromium, iron, manganese, zinc, calcium, gallium, barium, zirconium, indium, praseodymium, lanthanum, tin, cerium titanium cobalt, palladium, rhodium, platinum and compatible mixtures thereof.

5. The method according to claim 1, wherein the exhaust treatment catalyst is selected from the group consisting of oxidation catalysts and three-way catalysts.

6. The method according to claim 1, wherein the exhaust treatment catalyst is located (1) between the hydrocarbon polymerization catalyst and the hydrocarbon absorber or (2) downstream of the hydrocarbon absorber.

\* \* \* \* \*